US009212586B2

(12) United States Patent
Iwatani (10) Patent No.: US 9,212,586 B2
(45) Date of Patent: Dec. 15, 2015

(54) EXHAUST GAS PURIFICATION APPARATUS FOR INTERNAL COMBUSTION ENGINE

(75) Inventor: Kazuki Iwatani, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/403,982

(22) PCT Filed: May 29, 2012

(86) PCT No.: PCT/JP2012/063795
§ 371 (c)(1),
(2), (4) Date: Nov. 25, 2014

(87) PCT Pub. No.: WO2013/179393
PCT Pub. Date: Dec. 5, 2013

(65) Prior Publication Data
US 2015/0121854 A1     May 7, 2015

(51) Int. Cl.
*F01N 3/20* (2006.01)
*F02D 41/02* (2006.01)
(Continued)

(52) U.S. Cl.
CPC .............. *F01N 3/2006* (2013.01); *F01N 3/106* (2013.01); *F01N 3/208* (2013.01); *F01N 3/2033* (2013.01);
(Continued)

(58) Field of Classification Search
CPC ..... F01N 3/0814; F01N 3/106; F01N 3/2066; F01N 11/002; F01N 13/009; F01N 2430/085; F01N 2560/06; F01N 2570/14; F01N 2610/03; F01N 2900/0412; F01N 2900/0418; F01N 290/0422; F01N 2900/1404; F01N 2900/1602; F01N 2900/1621; F01N 2900/1626; F01N 2900/1631; F02D 41/0245; F02D 41/0255

USPC .......... 60/276, 277, 285, 286, 295, 300, 301, 60/303, 320
See application file for complete search history.

(56) References Cited

U.S. PATENT DOCUMENTS

2010/0037596 A1   2/2010   Toshioka et al.
2010/1003759      2/2010   Toshioka et al.
2012/0006002 A1*  1/2012   Hagimoto et al. .............. 60/274

FOREIGN PATENT DOCUMENTS

JP   2001-164928 A   6/2001
JP   2001-227381 A   8/2001
(Continued)

OTHER PUBLICATIONS

International Search Report from the Japanese Patent Office in International Application No. PCT/JP2012/063654, 1 page.

*Primary Examiner* — Thomas Denion
*Assistant Examiner* — Jorge Leon, Jr.
(74) *Attorney, Agent, or Firm* — Finnegan, Henderson, Farabow, Garrett & Dunner, LLP (57) ABSTRACT

An object is to reduce the increase in the fuel consumption or the increase in emissions caused by processing for raising the temperature of an $NO_x$ catalyst in an exhaust gas purification apparatus for an internal combustion engine having the $NO_x$ catalyst arranged in an exhaust passage of the internal combustion engine. To achieve the above object, an exhaust gas purification apparatus for an internal combustion engine according to the present invention executes processing for raising the temperature of the $NO_x$ catalyst on condition that a temperature change ratio with a predetermined amount of assumed temperature rise of the $NO_x$ catalyst is equal to or higher than a reference value. According to the present invention, it is possible to activate the $NO_x$ quickly while keeping the unwanted increase in the fuel consumption and emissions caused by the temperature raising processing small.

15 Claims, 7 Drawing Sheets

(51) Int. Cl.
*F02D 41/40* (2006.01)
*F01N 3/10* (2006.01)
*F01N 9/00* (2006.01)
*F01N 13/00* (2010.01)
*F02D 41/14* (2006.01)

(52) U.S. Cl.
CPC ............... *F01N 9/00* (2013.01); *F01N 13/009* (2014.06); *F02D 41/024* (2013.01); *F02D 41/405* (2013.01); *F01N 3/2066* (2013.01); *F01N 2610/01* (2013.01); *F01N 2610/02* (2013.01); *F01N 2610/105* (2013.01); *F01N 2610/146* (2013.01); *F01N 2900/0418* (2013.01); *F01N 2900/1404* (2013.01); *F01N 2900/1602* (2013.01); *F01N 2900/1621* (2013.01); *F01N 2900/1811* (2013.01); *F02D 41/1446* (2013.01); *F02D 2200/0802* (2013.01); *Y02T 10/26* (2013.01); *Y02T 10/44* (2013.01)

(56) References Cited

FOREIGN PATENT DOCUMENTS

| | | |
|---|---|---|
| JP | 2008-231966 A | 10/2002 |
| JP | 2003-269146 A | 9/2003 |
| JP | 2007-16713 | 1/2007 |
| JP | 2010-112192 A | 5/2010 |
| JP | 2010-166927 A | 8/2010 |
| JP | 2010-168927 A | 8/2010 |

* cited by examiner

EXHAUST GAS PURIFICATION APPARATUS FOR INTERNAL COMBUSTION ENGINE

CROSS REFERENCE TO RELATED PATENT APPLICATIONS

This application is a national phase of International Application No. PCT/JP2012/063795, filed on May 29, 2012. The application is incorporated herein by reference in its entirety.

TECHNICAL FIELD

The present invention relates to an exhaust gas purification apparatus for an internal combustion engine and more particularly to a technology of raising the temperature of an $NO_x$ catalyst provided in an exhaust passage of an internal combustion engine.

BACKGROUND ART

As an exhaust gas purification apparatus for an internal combustion engine, an apparatus having an oxidation catalyst or an $NO_x$ catalyst provided in an exhaust passage of an internal combustion engine has been known. There has been known a technology pertaining to such an exhaust gas purification apparatus for an internal combustion engine in which the internal combustion engine is run in either an exhaust gas temperature raising mode, in which the exhaust gas temperature rises, or an exhaust component reduction mode in which the amount of hydrocarbon (HC) in the exhaust gas is reduced. Specifically, there has been known a technology in which during the period from the start of the internal combustion engine until the catalyst is activated, the internal combustion engine is run in the exhaust gas temperature rising mode, and after the activation of the catalyst, the exhaust gas temperature raising mode and the exhaust component reduction mode are switched according to the purifying performance of the catalyst or exhaust components (see, for example, Patent Literature 1).

CITATION LIST

Patent Literature

Patent Literature 1: Japanese Patent Application Laid-Open No. 2010-112192

SUMMARY OF THE INVENTION

Problems to be Solved by the Invention

In cases where the internal combustion engine is in a low load operation state continuously after the start of the internal combustion engine and where the internal combustion engine is stopped and restarted repeatedly in a short period of time, it is difficult to activate the catalyst. Then, the period in which the internal combustion engine is run in the aforementioned exhaust gas temperature raising mode is prolonged or the opportunity that the internal combustion engine is run in the aforementioned exhaust gas temperature raising mode is increased. When the internal combustion engine is run in the aforementioned exhaust gas temperature raising mode, the air-fuel ratio of the air-fuel mixture is made low (rich), the fuel ignition timing is retarded, and/or post-injection (or after-injection) of fuel is performed. Consequently, prolongment of the period in which the internal combustion engine is run in the aforementioned exhaust gas temperature raising mode or an increase in the opportunity that the internal combustion engine is run in the aforementioned exhaust gas temperature raising mode leads to an increase in the fuel consumption. Moreover, the period in which the internal combustion engine runs in a state in which the catalyst is not active is prolonged, possibly resulting in an increase in emissions.

The present invention has been made in view of the above-described circumstances, and its object is to provide a technology that can make the increase in the fuel consumption and the increase in emissions caused by processing for raising the temperature of an $NO_x$ catalyst small in an exhaust gas purification apparatus for an internal combustion engine having the $NO_x$ catalyst arranged in an exhaust passage of the internal combustion engine.

Means for Solving the Problems

In the present invention, to solve the above-described problem, we focused on the correlation of the temperature of the $NO_x$ catalyst and the $NO_x$ removal rate (which is the ratio of the amount of $NO_x$ removed by the $NO_x$ catalyst to the amount of $NO_x$ flowing into the $NO_x$ catalyst).

When the $NO_x$ catalyst is in an inactive state, the $NO_x$ removal rate increases with rise in the temperature of the $NO_x$ catalyst. However, the ratio of the increase in the $NO_x$ removal rate to the rise in the temperature of the $NO_x$ catalyst (which will be hereinafter referred to as the "temperature change ratio") is not constant. Therefore, in some cases, the increase in the $NO_x$ removal rate is small relative to the rise in the temperature of the $NO_x$ catalyst (namely, the temperature change ratio is low). In other cases, the increase in the $NO_x$ removal rate is large relative to the rise in the temperature of the $NO_x$ catalyst (namely, the temperature change ratio is high).

For example, when the temperature of the $NO_x$ catalyst is lower than a lower limit temperature lower below the activation temperature, the increase in the $NO_x$ removal rate is small relative to the rise in the temperature of the $NO_x$ catalyst. On the other hand, when the temperature of the $NO_x$ catalyst is equal to or higher than the aforementioned lower limit temperature and lower than the aforementioned activation temperature, the increase in the $NO_x$ removal rate is large relative to the rise in the temperature of the $NO_x$ catalyst. The "lower limit temperature" mentioned above is, for example, the temperature at which a part of the $NO_x$ catalyst is activated (partial activation temperature). The "activation temperature" is the temperature at which the $NO_x$ catalyst is activated in its entirety (full activation temperature).

If the temperature raising processing is executed when the temperature of the $NO_x$ catalyst is lower than the aforementioned lower limit temperature, the length of time over which the temperature raising processing is executed becomes long, because the temperature change ratio of the $NO_x$ catalyst is small. In particular, in cases where the internal combustion engine is in a low load operation state continuously after the start of the internal combustion engine, the length of time over which the temperature raising processing is executed tends to be long. If the length of time over which the temperature raising processing is executed is long, the fuel consumption increases, and the amount of emissions (smoke and carbon dioxide $CO_2$) also increases.

In view of the above, the exhaust gas purification apparatus for an internal combustion engine according to the present invention is adapted to execute the processing for raising the temperature of the $NO_x$ catalyst on condition that the aforementioned temperature change ratio is equal to or higher than a reference value. In other words, the exhaust gas purification apparatus for an internal combustion engine according to the present invention is adapted not to execute the processing for raising the temperature of the $NO_x$ catalyst if the aforementioned temperature change ratio is lower than the reference value, even if the $NO_x$ catalyst is in an inactive state.

Specifically, an exhaust gas purification apparatus for an internal combustion engine according to the present invention comprises:

an $NO_x$ catalyst provided in an exhaust passage of an internal combustion engine mounted on a vehicle;

temperature raising means that executes temperature raising processing, which is processing for raising the temperature of said $NO_x$ catalyst, by raising the temperature of exhaust gas flowing into said $NO_x$ catalyst;

measuring means for measuring the temperature of said $NO_x$ catalyst; and control means that enables said temperature raising processing to be executed on condition that a temperature change ratio, which is defined to be a ratio of an increase in an $NO_x$ removal rate caused by a predetermined amount of assumed temperature rise of the $NO_x$ catalyst from the temperature measured by said measuring means to said predetermined amount, is equal to or higher than a reference value.

The "predetermined amount" mentioned above may be an amount that makes the distinction between cases where the temperature change ratio is large and cases where the temperature change ratio is small clear. The aforementioned predetermined amount is determined in advance by an adaptation process based on, for example, experiments. The "reference value" is, for example, the lowest temperature change ratio at which the amount of increase in the $NO_x$ removal rate is considered to be appropriate relative to the fuel consumption needed to raise the temperature of the $NO_x$ catalyst by the predetermined amount. This reference value is determined in advance by an adaptation process based on, for example, experiments.

With the exhaust gas purification apparatus for an internal combustion engine having the above-described features, the temperature raising processing is not executed when the temperature change ratio with the predetermined amount of temperature rise of the $NO_x$ catalyst is lower than the reference value. In other words, the temperature raising processing is executed only when the temperature change ratio with the predetermined amount of temperature rise of the $NO_x$ catalyst is equal to or higher than the reference value.

If the temperature raising processing is executed when the aforementioned temperature change ratio is equal to or higher than the reference value, the temperature of the $NO_x$ catalyst and the $NO_x$ removal rate increase quickly. In particular, even in cases where the internal combustion engine is in a low load operation state continuously after the start of the internal combustion engine, the temperature of the $NO_x$ catalyst and the $NO_x$ removal rate can be increased quickly if the temperature raising processing is executed on condition that the aforementioned temperature change ratio is equal to or higher than the reference value. Consequently, the length of time over which the temperature raising processing is executed can be made short.

Consequently, with the exhaust gas purification apparatus for an internal combustion engine according to the present invention, the increase in the fuel consumption and the increase in emissions due to the temperature raising processing can be made small. In other words, with the exhaust gas purification apparatus for an internal combustion engine according to the present invention, it is possible to activate the $NO_x$ catalyst while keeping the increase in the fuel consumption and the increase in emissions caused by the execution of the temperature raising processing small.

The exhaust gas purification apparatus for an internal combustion engine according to the present invention may further comprise an oxidation catalyst provided in the exhaust passage upstream of the $NO_x$ catalyst. When this is the case, the temperature raising means may be adapted to raise the temperature of the exhaust gas flowing into the $NO_x$ catalyst by supplying unburned fuel to the oxidation catalyst.

When the temperature of the oxidation catalyst is lower than a specific activation temperature (e.g. a partial activation temperature), the oxidation rate of unburned fuel in the oxidation catalyst (which is the ratio of the amount of unburned fuel oxidized in the oxidation catalyst to the amount of unburned fuel flowing into the oxidation catalyst) is very small.

Therefore, the control means may be adapted to enable supply of unburned fuel to the oxidation catalyst on condition that the temperature of said oxidation catalyst is equal to or higher than a predetermined activation temperature and the aforementioned temperature change ratio is equal to or higher than the aforementioned reference value. If the temperature raising processing is executed according to the above condition, the temperature raising processing can be executed while keeping the amount of unburned fuel emitted to the atmosphere without being oxidized in the oxidation catalyst or the $NO_x$ catalyst small. Moreover, in the case where the temperature raising processing is executed according to the above condition, a relatively large amount of fuel may be supplied to the oxidation catalyst, allowing a further decrease in the length of the time over which the temperature raising processing is executed.

The exhaust gas purification apparatus for an internal combustion engine according to the present invention may further comprise calculation means for integrating the amount of emissions contained in exhaust gas flowing out of the oxidation catalyst. When this is the case, the control means may disable the execution of the temperature raising processing when the integrated amount of emissions calculated by the calculation means is larger than a comparison value.

The "comparison value" mentioned above is a value equal to the integrated value of emissions in the case where the temperature raising processing is executed by a conventional method. The conventional method includes, for example, supplying unburned fuel to the oxidation catalyst continuously during the period from the start of the internal combustion engine until the $NO_x$ catalyst becomes active or supplying unburned fuel to the oxidation catalyst continuously during the period from the time at which the temperature of the oxidation catalyst reaches or exceeds a predetermined activation temperature until the $NO_x$ catalyst becomes active. The "emissions" are exhaust gas components whose amount increase with the execution of the temperature raising processing. The emissions include smoke and carbon dioxide ($CO_2$) etc. The amount of smoke and $CO_2$ flowing out of the oxidation catalyst per unit time can be calculated using as parameters the amount of unburned fuel supplied to the oxidation catalyst and the temperature of the oxidation catalyst.

With the exhaust gas purification apparatus for an internal combustion engine having the above-described feature, the temperature raising processing is not executed when the integrated amount of emissions calculated by the calculation means is larger than the comparison value, even if the aforementioned temperature change ratio is equal to or higher than the reference value.

Let us consider an exemplary case where the operation of the internal combustion engine is stopped during or after the temperature raising processing is executed and the internal combustion engine is restarted after the temperature of the $NO_x$ catalyst becomes lower than the activation temperature. If the temperature raising processing is executed again after the restart of the internal combustion engine, the integrated amount of emission may possibly become larger than the aforementioned comparison value.

On the other hand, if the execution of the temperature raising processing is disabled when the integrated amount of emissions is larger than the comparison value, the integrated amount of emission can be made substantially equal to or smaller than that with the conventional method. Although there may be cases where the amount of emission becomes temporarily larger than that with the conventional temperature raising processing, in particular if the amount of unburned fuel supplied to the oxidation catalyst during the execution of the temperature raising processing is increased to be larger than that with the conventional temperature raising processing, the amount of emission (integrated amount) over the medium and long term can be made substantially equal to or smaller than that with the conventional method.

The control means according to the present invention may be adapted to decrease the amount of unburned fuel supplied to the oxidation catalyst when the $NO_x$ removal rate of the $NO_x$ catalyst exceeds a specific value while the temperature raising processing is being executed. The "specific value" mentioned above is, for example, a value smaller than the $NO_x$ removal rate in the state in which the $NO_x$ catalyst is active in its entirety and equal to the $NO_x$ removal rate in the state in which most of the $NO_x$ catalyst is active. If the amount of unburned fuel supplied to the oxidation catalyst is decreased according to the above condition, it is possible to further reduce the increase in the fuel consumption and the increase in emissions caused by the temperature raising processing.

The control means according to the present invention may determine that the aforementioned temperature change ratio is equal to or higher than the aforementioned reference value if the temperature measured by the aforementioned measuring means falls within a predetermined temperature range. The "predetermined temperature range" mentioned above is, for example, a temperature range in which the aforementioned temperature change ratio is equal to or higher than the aforementioned reference value. This range is determined in advance by an adaptation process based on, for example, experiments.

The $NO_x$ removal rate of the $NO_x$ catalyst can change due to a factor other than the temperature of the $NO_x$ catalyst in some cases. In view of this, the control means according to the present invention may be adapted to determine that the aforementioned temperature change ratio is equal to or higher than the aforementioned reference value if the $NO_x$ removal rate of said $NO_x$ catalyst falls within a predetermined range of the removal rate. The "predetermined range of the removal rate" is a range of the $NO_x$ removal rate in which the aforementioned temperature change ratio is equal to or larger than the aforementioned reference value. The $NO_x$ removal rate of the $NO_x$ catalyst can be calculated based on the measurement values of $NO_x$ sensors arranged upstream and downstream of the $NO_x$ catalyst.

The control means according to the present invention may be adapted to calculate the temperature change ratio using as parameters the flow rate of the exhaust gas, the air-fuel ratio of the exhaust gas, the temperature of the oxidation catalyst, and the temperature of the $NO_x$ catalyst and to compare the result of calculation and the aforementioned reference value.

Advantageous Effects of the Invention

According to the present invention, it is possible to make the increase in the fuel consumption and the increase in emissions caused by processing for raising the temperature of an $NO_x$ catalyst small in an exhaust gas purification apparatus for an internal combustion engine having the $NO_x$ catalyst arranged in an exhaust passage of the internal combustion engine.

EMBODIMENTS FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Embodiment 1

Figure 1:
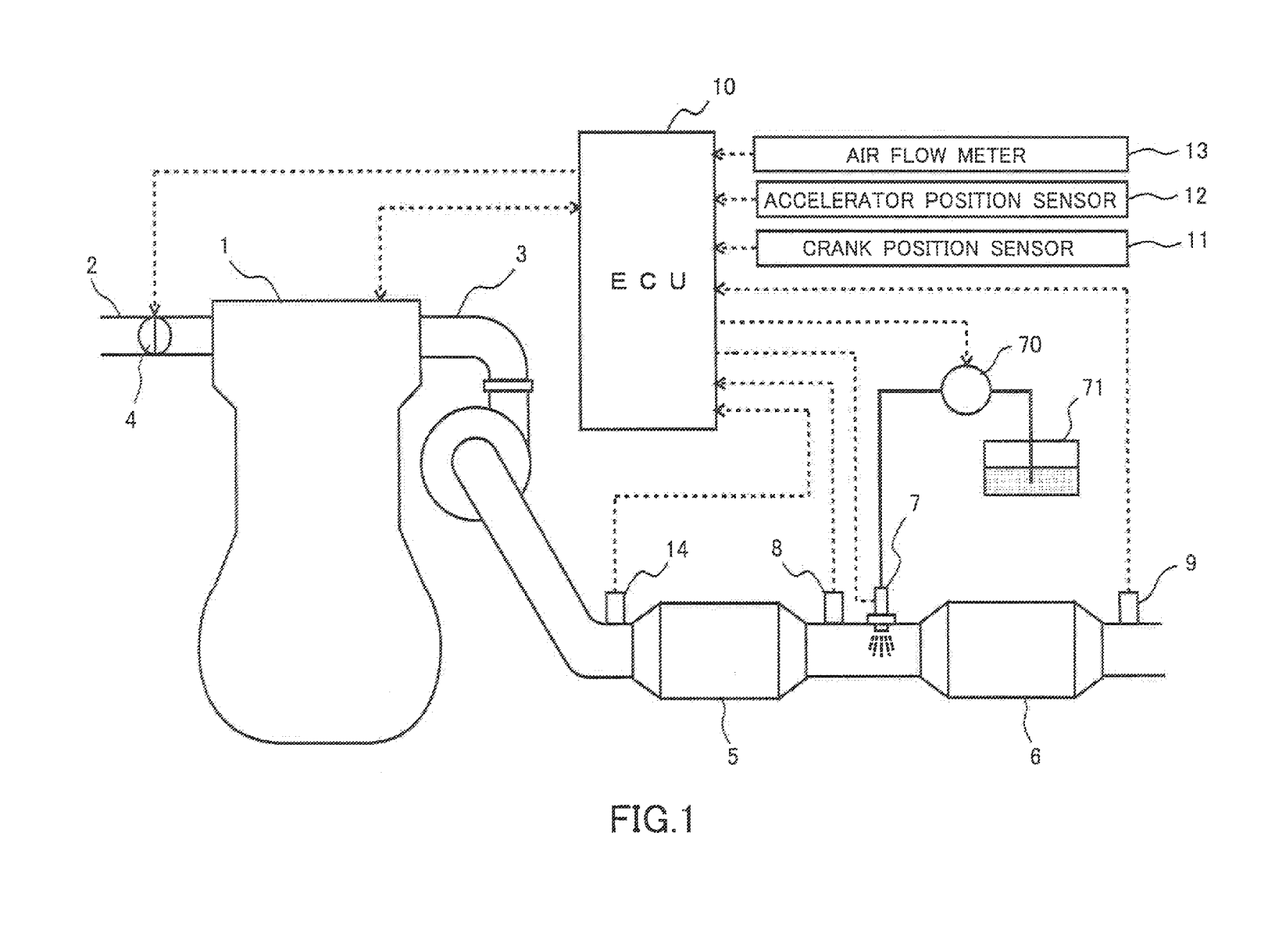
FIG. 1 is a diagram showing the general configuration of an internal combustion engine to which the present invention is applied and its air-intake and exhaust systems.

Firstly, a first embodiment of the present invention will be described with reference to FIGS. 1 to 5. FIG. 1 is a diagram showing the general configuration of an internal combustion engine to which the present invention is applied.

The internal combustion engine 1 shown in FIG. 1 is a compression-ignition internal combustion engine (diesel engine) having a plurality of cylinders. Internal combustion engines to which the present invention is applied are not limited to compression-ignition internal combustion engines, but they may be spark-ignition internal combustion engines (gasoline engines) run in a lean burn condition.

The internal combustion engine 1 is connected with an intake passage 2 and an exhaust passage 3. The intake passage 2 is a passage used to introduce fresh air (air) taken from the atmosphere to the cylinders of the internal combustion engine 1. The exhaust passage 3 is a passage through which burned gas (exhaust gas) discharged from the cylinders of the internal combustion engine 1 flows.

A throttle valve 4 is provided in the middle of the intake passage 2. The throttle valve 4 is a valve unit that adjusts the amount of air taken into the cylinders of the internal combustion engine 1 by varying the channel cross sectional area of the intake passage 2. The throttle valve 4 has a valve body and an electric motor that drives the valve body to open/close it. The electric motor is controlled by an ECU 10 that will be described later.

In the middle of the exhaust passage 3, there are provided a first catalyst casing 5 and a second catalyst casing 6 arranged in series in order from the upstream. The first catalyst casing 5 is a cylindrical casing, which houses an oxidation catalyst and a particulate filter. In this way, the oxidation catalyst may be supported either on a catalyst carrier arranged upstream of the particulate filter or on the particulate filter.

The second catalyst casing 6 is a cylindrical casing, which houses a catalyst carrier on which a selective reduction catalyst is supported. The catalyst carrier may be, for example, a monolithic base member made of a heat resisting steel such as cordierite or Fe—Cr—Al alloy having a honeycomb structure in its lateral cross section that is coated with an alumina-based or zeolite-based activation component (carrier). The catalyst carrier supports a precious metal catalyst (e.g. platinum Pt or palladium Pd) having an oxidizing ability. The selective reduction catalyst having the above-described structure corresponds to the $NO_x$ catalyst according to the present invention.

A catalyst carrier supporting an oxidation catalyst may also be provided downstream of the selective reduction catalyst in the second catalyst casing 6. When this is the case, the oxidation catalyst can oxidize a portion of the reducing agent supplied from a later-described reducing agent addition valve 7 to the selective reduction catalyst that has passed through the selective reduction catalyst.

The reducing agent addition valve 7 used to add a reducing agent, which is $NH_3$ or a precursor of $NH_3$, is attached to the exhaust passage 3 between the first catalyst casing 5 and the second catalyst casing 6. The reducing agent addition valve 7 is a valve device having an injection hole that is opened/closed by shift of a needle. The reducing agent addition valve 7 is connected to a reducing agent tank 71 via a pump 70. The pump 70 sucks the reducing agent stored in the reducing agent tank 71 and pumps the reducing agent sucked to the reducing agent addition valve 7. The reducing agent addition valve 7 injects the reducing agent pumped from the pump 70 into the exhaust passage 3. Timing of opening/closing the reducing agent addition valve 7 and the pumping pressure of the pump 70 are electrically controlled by the ECU 10.

The reducing agent stored in the reducing agent tank 71 may be aqueous solution of urea or ammonium carbamate, or $NH_3$ gas. In this embodiment, an illustrative case in which aqueous urea solution is used as reducing agent will be described.

As aqueous urea solution is injected from the reducing agent addition valve 7, the aqueous urea solution flows into the second catalyst casing 6 with the exhaust gas. Then, the aqueous urea solution receives heat from the exhaust gas and the second catalyst casing 6, so that it is decomposed by heat or hydrolyzed. Heat decomposition or hydrolysis of aqueous urea solution generates ammonia ($NH_3$). The ammonia ($NH_3$) thus generated is adsorbed or stored by the selective reduction catalyst. The ammonia adsorbed or stored by the selective reduction catalyst reacts with nitrogen oxides ($NO_x$) contained in the exhaust gas to generate nitrogen ($N_2$) and water ($H_2O$). Thus, ammonia ($NH_3$) acts as a reducing agent for the nitrogen oxides ($NO_x$).

The internal combustion engine 1 having the above-described structure is equipped with the ECU 10. ECU 10 is an electronic control unit including a CPU, a ROM, a RAM, and a backup RAM etc. The ECU 10 is electrically connected with various sensors such as a first exhaust gas temperature sensor 8, a second exhaust gas temperature sensor 9, a crank position sensor 11, an accelerator position sensor 12, an air flow meter 13, and an A/F sensor 14.

The first exhaust gas temperature sensor 8 is provided in the exhaust passage 3 downstream of the first catalyst casing 5 and upstream of the second catalyst casing 6 and outputs an electrical signal correlating with the temperature of the exhaust gas flowing out of the first catalyst casing 5. The second exhaust gas temperature sensor 9 is provided in the exhaust passage 3 downstream of the second catalyst casing 6 and outputs an electrical signal correlating with the temperature of the exhaust gas flowing out of the second catalyst casing 6. The crank position sensor 11 outputs an electrical signal correlating with the rotational position of the output shaft (crankshaft) of the internal combustion engine 1. The accelerator position sensor 12 outputs an electrical signal correlating with the operation amount of the accelerator pedal (accelerator opening degree). The air flow meter 13 outputs an electrical signal correlating with the amount of air (amount of intake air) taken into the internal combustion engine 1. The A/F sensor 14 is provided in the exhaust passage 3 upstream of the first catalyst casing 5 and outputs an electrical signal correlating with the air-fuel ratio of the exhaust gas.

The ECU 10 is electrically connected with various devices (e.g. fuel injection valves) attached to the internal combustion engine 1, the throttle valve 4, the reducing agent addition valve 7, and the pump 70 etc. The ECU 10 electrically controls the devices of the internal combustion engine 1, the throttle valve 4, the reducing agent addition valve 7, and the pump 70 etc. based on output signals of the aforementioned various sensors. For example, the ECU 10 executes control for raising the temperature of the selective reduction catalyst housed in the second catalyst casing 6 as well as known control such as control of fuel injection in the internal combustion engine and the addition control for causing the reducing agent addition valve 7 to inject reducing agent intermittently. In the following, a method of executing the temperature raising control in this embodiment will be described.

When the internal combustion engine 1 is cold-started, the oxidation catalyst and the selective reduction catalyst are in inactive states, namely states in which the oxidation catalyst cannot oxidize unburned fuel components (HC and CO etc.) in the exhaust gas and the selective reduction catalyst cannot reduce nitrogen oxides ($NO_x$) In the exhaust gas. Therefore, it is necessary to activate the oxidation catalyst and the selective reduction catalyst early.

A known method of activating the oxidation catalyst and the selective reduction catalyst early is to execute processing (temperature raising processing) of supplying unburned fuel components to the oxidation catalyst by supplying fuel to the exhaust passage 3 upstream of the oxidation catalyst or performing after-injection through the fuel injection valve into a cylinder on an expansion stroke or on an exhaust stroke. This method can raise the temperatures of the oxidation catalyst and the selective reduction catalyst using heat generated in oxidation of the unburned fuel components in the oxidation catalyst.

Figure 2:
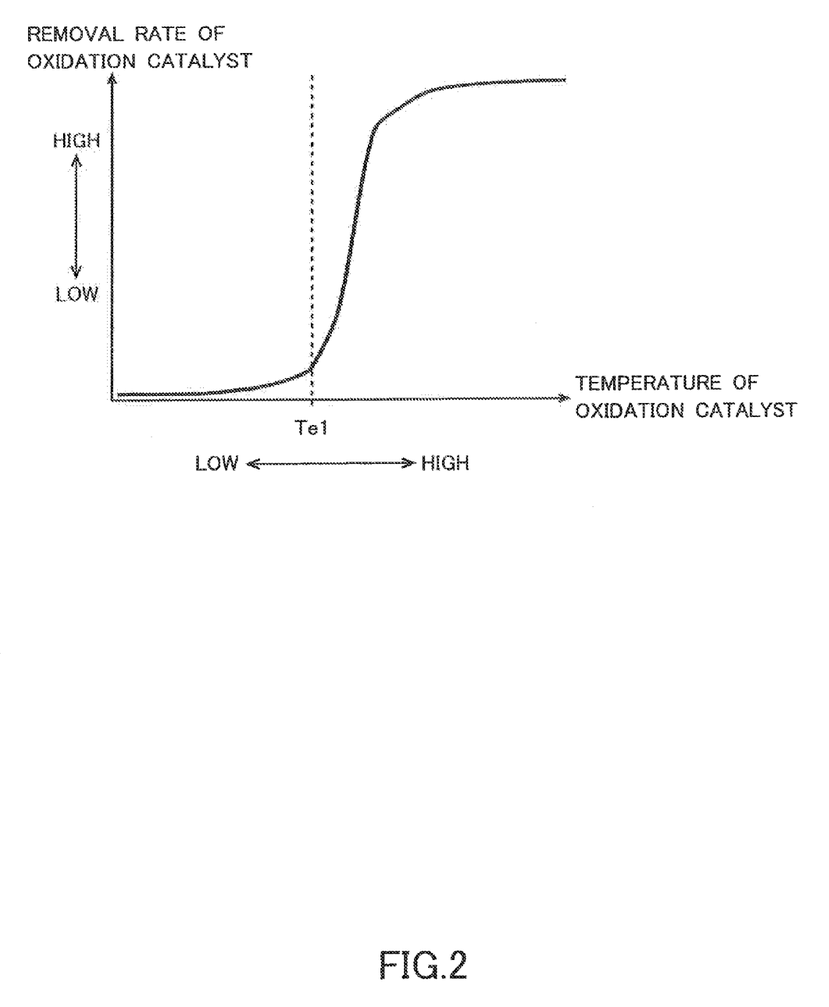
FIG. 2 is a graph showing a relationship between the temperature and the removal rate of an oxidation catalyst.

When the temperatures of the oxidation catalyst and the selective reduction catalyst are lower than specific temperatures, the increase in the removal rate relative to the rise in the temperature is small. FIG. 2 shows a relationship between the temperature (bed temperature) and the removal rate (rate of oxidation of the unburned fuel components) of the oxidation catalyst. As will be seen in FIG. 2, when the temperature of the oxidation catalyst is lower than a specific temperature (first temperature) Te1, the removal rate increases little as the temperature of the oxidation catalyst rises. The "first temperature Te1" mentioned above is a temperature at which at least a part of the oxidation catalyst housed in the first catalyst casing 5 is activated (partial activation temperature). If the temperature raising processing is executed when the temperature of the oxidation catalyst is lower than the aforementioned first temperature Te1, there is a possibility that most of the unburned fuel components supplied to the oxidation catalyst will be emitted to the atmosphere without being oxidized.

Figure 3:
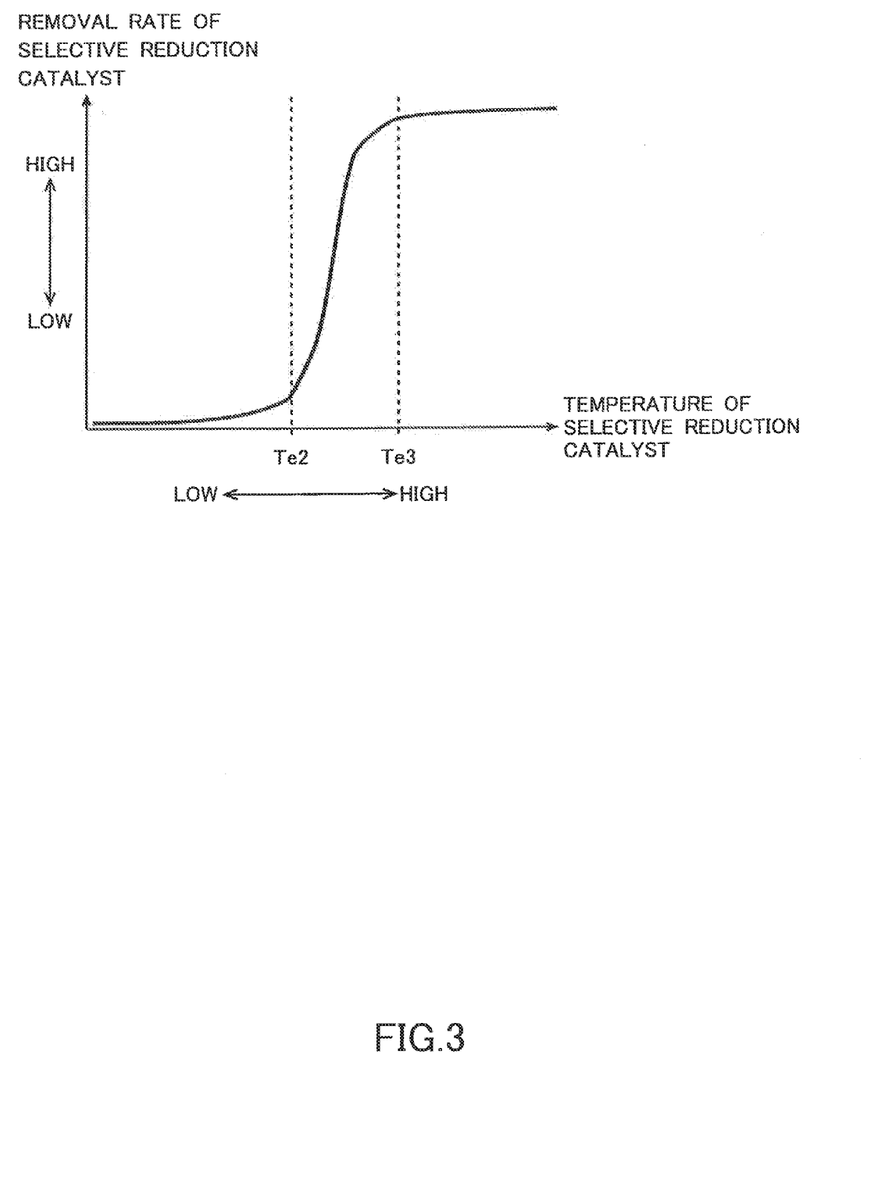
FIG. 3 is a graph showing a relationship between the temperature and the removal rate of a selective reduction catalyst.

FIG. 3 is a graph showing a relationship between the temperature and the removal rate ($NO_x$ removal rate) of the selective reduction catalyst. As will be seen from FIG. 3, when the temperature of the selective reduction catalyst is lower than a specific temperature (second temperature) Te2, the increase in the $NO_x$ removal rate relative to the rise in the temperature of the selective reduction catalyst is small. On the other hand, when the temperature of the selective reduction catalyst is in a range from the aforementioned second temperature Te2 (inclusive) to a third temperature Te3 (exclusive), the increase in the $NO_x$ removal rate relative to the rise in the temperature of the selective reduction catalyst is large.

The "second temperature Te2" mentioned above is the lowest temperature at which the temperature change ratio with a predetermined amount of temperature rise of the selective reduction catalyst (i.e. the ratio of the increase in the $NO_x$ removal rate to the rise in the temperature of the selective reduction catalyst) is equal to or higher than a reference value. The second temperature Te2 is, for example, a temperature at which at least a part of the selective reduction catalyst housed in the second catalyst casing 6 is activated (partial activation temperature). The "third temperature Te3" is the highest temperature at which the temperature change ratio with the predetermined amount of temperature rise of the selective reduction catalyst is equal to or higher than the reference value. The third temperature Te3 is, for example, a temperature at which the entirety of the selective reduction catalyst housed in the second catalyst casing is activated (full activation temperature).

If the temperature raising processing is executed when the temperature of the selective reduction catalyst is lower than the aforementioned second temperature Te2, while it is possible to raise the temperature of the selective reduction catalyst, it is not possible to increase the $NO_x$ removal rate adequately. This may possibly lead to an unwanted increase in the fuel consumption and/or an unwanted increase in the amount of smoke and/or carbon dioxide ($CO_2$) generated in the oxidation catalyst. On the other hand, if the temperature raising processing is executed when the temperature of the selective reduction catalyst is equal to or higher than the aforementioned second temperature Te2 and lower than the aforementioned third temperature Te3, it is possible to raise the temperature of the selective reduction catalyst and to increase the $NO_x$ removal rate adequately.

Therefore, it is preferred that the temperature raising processing be executed on condition that the temperature of the oxidation catalyst is equal to or higher than the first temperature Te1 and, at the same time, the temperature of the selective reduction catalyst is equal to or higher than the second temperature Te2 and lower than the third temperature Te3.

Figure 4:
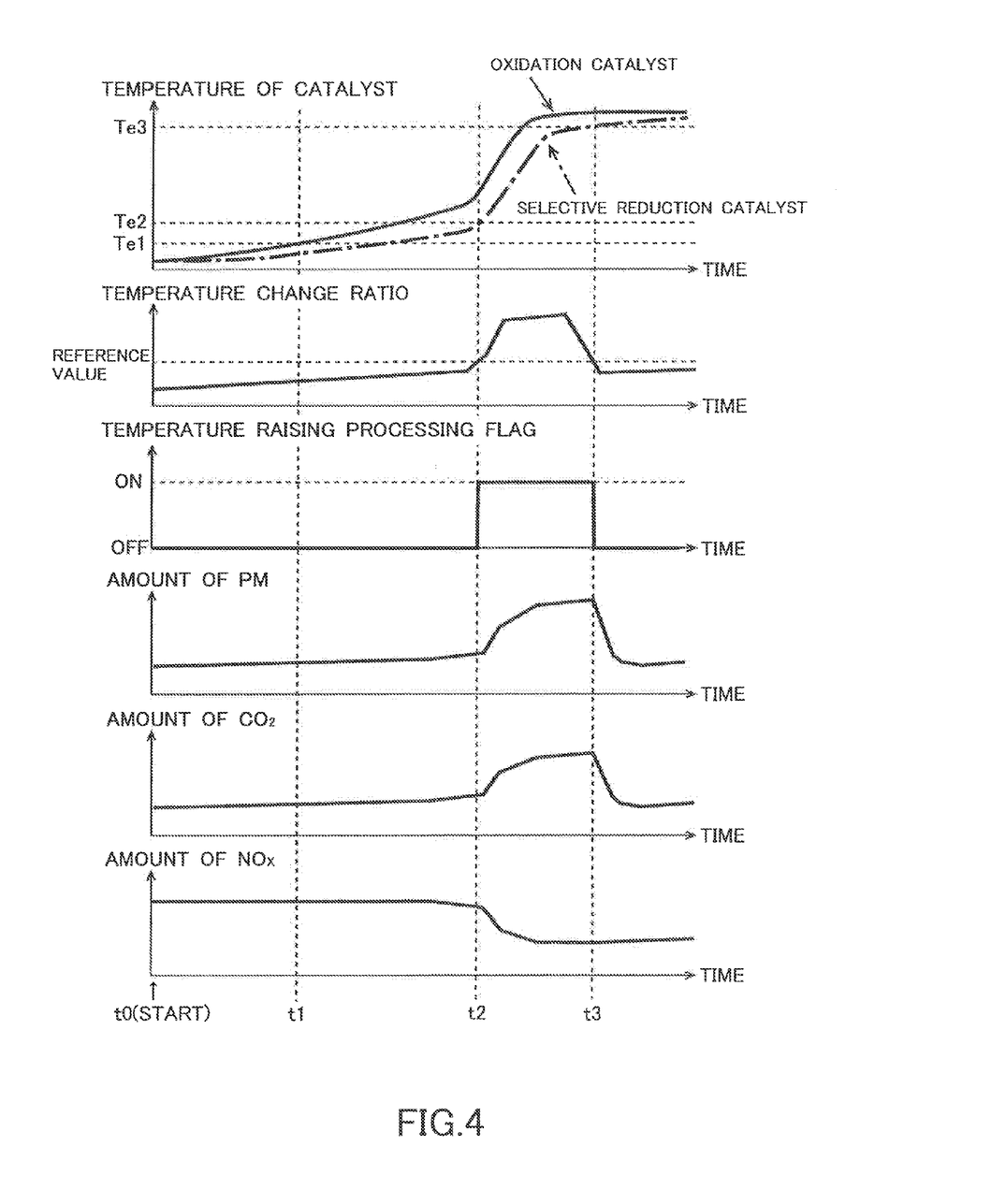
FIG. 4 is a timing chart of a method of executing temperature raising processing in a first embodiment.

Now, how the temperature raising processing is executed in this embodiment will be described with reference to the timing chart in FIG. 4. After the internal combustion engine 1 is started (at t0 in FIG. 4), the heat of the exhaust gas is transferred to the oxidation catalyst and the selective reduction catalyst. In connection with this, since the oxidation catalyst is arranged upstream of the selective reduction catalyst, the temperature of the oxidation catalyst rises earlier than the selective reduction catalyst. Consequently, the temperature of the oxidation catalyst firstly reaches or exceeds the aforementioned first temperature Te1 (at t1 in FIG. 4), and thereafter, the temperature of the selective reduction catalyst reaches or exceeds the aforementioned second temperature Te2 (at t2 in FIG. 4).

During the period from the start of the internal combustion engine 1 until the temperature of the selective reduction catalyst reaches or exceeds the aforementioned second temperature Te2 (which will be hereinafter referred to as the "first period"), the ratio (temperature change ratio) of the increase in the $NO_x$ removal rate to the rise in the temperature of the selective reduction catalyst is small. Therefore, the temperature raising processing is not executed during the aforementioned first period (a temperature raising processing flag is OFF).

During the period from the time (t2 in FIG. 4) at which the temperature of the selective reduction catalyst reaches or exceeds the aforementioned second temperature Te2 to the time (t3 in FIG. 4) at which it reaches or exceeds the aforementioned third temperature Te3 (which will be hereinafter referred to as the "second period"), the temperature change ratio is much larger than that during the first period. Therefore, during the aforementioned second period, the temperature raising processing is executed (the temperature raising processing flag is ON). As the temperature raising processing is executed during the second period, the temperature of the selective reduction catalyst rises quickly, and the temperature change ratio increases quickly. Consequently, the $NO_x$ removal rate of the selective reduction catalyst can be increased in a short time.

It is preferred that while the temperature raising process is executed, the amount of unburned fuel components supplied to the oxidation catalyst per unit time be larger than that in conventional temperature raising processing (i.e. processing in which supply of unburned fuel components to the oxidation catalyst is started at the time of or just after the start of the internal combustion engine 1). This can make the temperature rising speed and the increasing speed of the $NO_x$ removal rate of the selective reduction catalyst higher. Consequently, even in the case where a low load operation state continues after the start of the internal combustion engine 1, the selective reduction catalyst can be activated quickly. Moreover, since the execution time of the temperature raising processing is shortened, the increase in the fuel consumption with the temperature raising processing can be made small.

If the amount of unburned fuel components supplied to the oxidation catalyst per unit time is increased there is a possibility that the amount of PM and the amount of $CO_2$ emitted from the oxidation catalyst may increase temporarily. However, the amount of smoke (PM) and the amount of $CO_2$ emitted from the oxidation catalyst before and after the execution of the temperature raising processing are smaller than those in the case where conventional temperature raising processing is executed. In consequence Consequently, the amount of PM and the amount of $CO_2$ flowing out of the oxidation catalyst during the period from the start of the internal combustion engine 1 to the activation of the selective reduction catalyst can be made substantially equal to or smaller than those in the case where the conventional temperature raising processing is executed. In other words, in the temperature raising processing in this embodiment, while there is a possibility that the amount of PM and the amount of $CO_2$ flowing out of the oxidation catalyst may become larger than those with the conventional temperature raising processing for a relatively short period of time, the amount of PM and the amount of $CO_2$ flowing out of the oxidation catalyst can be made small over a relatively long period of time.

Therefore, with the temperature raising processing in this embodiment, it is possible to activate the selective reduction catalyst in a short time while keeping the increase in the fuel consumption and the increase in emissions (i.e. PM and $CO_2$ flowing out of the oxidation catalyst) small.

Figure 5:
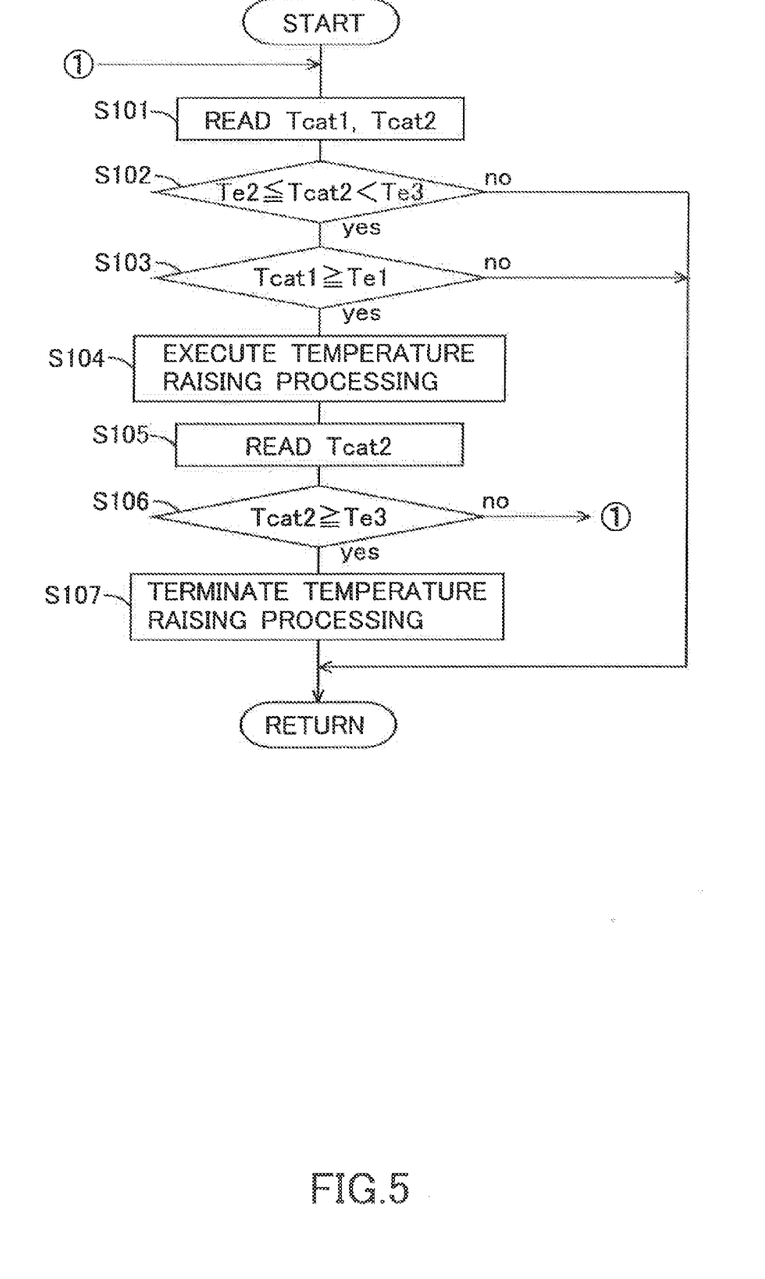
FIG. 5 is a flow chart of a processing routine executed by an ECU when the temperature raising processing is executed in the first embodiment.

Next, a procedure of executing the temperature raising processing in this embodiment will be described with reference to the flow chart in FIG. 5. FIG. 5 is a flow chart of a processing routine executed by the ECU 10 when the temperature raising processing is executed. The processing routine in FIG. 5 is stored in the ROM or the like of the ECU 10 in advance and executed by the ECU 10 periodically.

In the processing routine in FIG. 5, firstly in step S101, the ECU 10 reads the temperature of the oxidation catalyst and the temperature of the selective reduction catalyst. In this process, the ECU 10 reads in an output signal Tcat1 of the first exhaust gas temperature sensor 8 as the temperature of the oxidation catalyst and an output signal Tcat2 of the second exhaust gas temperature sensor 9 as the temperature of the selective reduction catalyst. The execution of the processing of step S101 by the ECU 10 embodies the measuring means according to the present invention.

In step S102, the ECU 10 determines whether or not the temperature Tcat2 of the selective reduction catalyst falls within a predetermined temperature range. The "predetermined temperature range" mentioned above is the temperature range from the aforementioned second temperature Te2 (inclusive) to the aforementioned third temperature Te3 (exclusive). If the determination made in step S102 is negative, the ECU 10 terminates the execution of this routine. On the other hand, the determination made in step S102 is affirmative, the ECU 10 proceeds to step S103.

In step S103, the ECU 10 determines whether or not the temperature Tcat1 of the oxidation catalyst is equal to or higher than the aforementioned first temperature Te1. If the determination made in step S103 is negative, the ECU 10 terminates the execution of this routine. On the other hand, if the determination made in step S103 is affirmative, the ECU 10 proceeds to step S104.

The execution of the processing of steps S102 and S103 by the ECU 10 embodies the control means according to the present invention.

In step S104, the ECU 10 executes the temperature raising processing. Specifically, the ECU 10 causes the fuel injection valve of a cylinder on an expansion stroke or on an exhaust stroke to inject fuel (after-injection). The amount of injected fuel in this processing is larger than that in the case where conventional temperature raising processing is executed. Executing the temperature raising processing in this way leads to a quick rise in the temperature of the selective reduction catalyst and a quick increase in the $NO_x$ removal rate. The execution of the processing of step S104 by the ECU 10 embodies the temperature raising means according to the present invention.

In step S105, the ECU 10 reads in an output signal Tcat2 of the second exhaust gas temperature sensor 9 again.

In step S106, the ECU 10 determines whether or not the temperature Tcat2 read in the above step S105 is equal to or higher than the aforementioned third temperature Te3. If the determination made in step S106 is negative, the ECU 10 executes the processing starting from step S101 again. On the other hand, if the determination made in step S106 is affirmative, the ECU 10 proceeds to step S107.

In step S107, the ECU 10 terminates the execution of the temperature raising processing. In other words, the ECU 10 causes the after-injection through the fuel injection valve to end.

Executing the temperature raising processing according to the above-described procedure can cause the temperature of the selective reduction catalyst to rise quickly while keeping the increase in the fuel consumption and the increase in emissions with the temperature raising processing small. In particular, it is possible to activate the selective reduction catalyst in a short time even in the case where a low load operation state continues after cold-start of the internal combustion engine 1, and therefore it is possible to keep the amount of $NO_x$ emitted to the atmosphere smaller than that in the case where conventional temperature raising processing is executed.

In this embodiment, an illustrative case in which the temperature raising processing is executed on condition that the temperature of the selective reduction catalyst falls within the range from the aforementioned second temperature Te2 (inclusive) to the aforementioned third temperature Te3 (exclusive). However, the $NO_x$ removal rate of the selective reduction catalyst can change due to a factor other than the temperature of the selective reduction catalyst in some cases. Consequently, the temperature change ratio of the selective reduction catalyst can also change due to a factor other than the temperature of the selective reduction catalyst.

In view of this, the ECU 10 may be adapted to execute the temperature raising processing on condition that the $NO_x$ removal rate of the selective reduction catalyst falls within a predetermined removal rate range. In this case, in step S102 of the above-described processing routine in FIG. 5, the ECU 10 may calculate the $NO_x$ removal rate of the selective reduction catalyst and determine whether or not the calculated $NO_x$ removal rate falls within the predetermined removal rate range. The "predetermined removal rate range" mentioned above is a range of the $NO_x$ removal rate in which the temperature change ratio of the selective reduction catalyst is equal to or higher than a reference value. This range is determined in advance based on experiments.

The $NO_x$ removal rate of the selective reduction catalyst can be calculated according to the following equation:

$$Enox = (Anoxin - Anoxout)/Anoxin,$$

where Enox is the $NO_x$ removal rate, Anoxin is the amount of $NO_x$ flowing into the selective reduction catalyst (inflowing $NO_x$ amount), and Anoxout is the amount of $NO_x$ flowing out of the selective reduction catalyst (outflowing $NO_x$ amount).

The inflowing $NO_x$ amount Anoxin mentioned above may be measured by an $NO_x$ sensor provided in the exhaust passage 3 upstream of the selective reduction catalyst or, alternatively, calculated based on the operation state of the internal combustion engine 1 (such as the amount of injected fuel, the amount of intake air, and/or the engine speed). The outflowing $NO_x$ amount Anoxout mentioned above may be measured by an $NO_x$ sensor provided in the exhaust passage 3 downstream of the selective reduction catalyst.

Determining whether or not the $NO_x$ removal rate of the selective reduction catalyst falls within the predetermined removal range can provide determination as to whether or not the temperature change ratio of the selective reduction catalyst is equal to or higher than the reference value with improved accuracy.

The ECU 10 may calculate the temperature change ratio with a predetermined amount of temperature rise of the selective reduction catalyst from its present temperature and determine whether or not the calculated temperature change ratio is equal to or higher than the reference value. The temperature change ratio in this case correlates with the present temperature of the selective reduction catalyst, the flow rate of the exhaust gas, the air-fuel ratio of the exhaust gas, and the amount of $NO_2$ contained in the exhaust gas (preferably, the ratio of the amount of $NO_2$ to the amount of $NO_x$ in the exhaust gas). The amount of $NO_x$ contained in the exhaust gas correlates with the present temperature of the oxidation catalyst and the air-fuel ratio of the exhaust gas.

Therefore, the ECU 10 may calculate the temperature change ratio with the predetermined amount of temperature rise of the selective reduction catalyst from its present temperature, using as parameters the present temperature of the selective reduction catalyst, the present temperature of the oxidation catalyst, the flow rate of the exhaust gas, and the air-fuel ratio of the exhaust gas and determine whether or not the calculated temperature change ratio is equal to or higher than the reference value. The relationship between the temperature change ratio and the present temperature of the selective reduction catalyst, the present temperature of the oxidation catalyst, the flow rate of the exhaust gas, and the air-fuel ratio of the exhaust gas may be prepared as a map stored in the ROM of the ECU 10.

Determining whether or not the temperature change ratio calculated in this way is equal to or higher than the reference value can provide determination as to whether or not the temperature change ratio of the selective reduction catalyst is equal to or higher than the reference value with improved accuracy.

The ECU 10 may be adapted to decrease the amount of fuel injected through the fuel injection valve by after-injection (the amount of after-injection) when the $NO_x$ removal rate of the selective reduction catalyst exceeds a specific value while the temperature raising processing is being executed. The "specific value" mentioned above is, for example, a value smaller than the $NO_x$ removal rate in the case where the selective reduction catalyst housed in the second catalyst casing 6 is active in its entirety and substantially equal to the $NO_x$ removal rate in the case where most of the $NO_x$ catalyst is active. If the amount of after-injection is decreased according to the above condition, the increase in the fuel consumption and the increase in emissions with the temperature raising processing can be further reduced.

Embodiment 2

A second embodiment of the present invention will be described with reference to FIGS. 6 and 7. In the following, features different from the above-described first embodiment will be described, and like features will not be described.

The difference between the above-described first embodiment and this embodiment resides in that temperature raising processing is executed on condition that the temperature change ratio with a predetermined amount of temperature rise of the selective reduction catalyst is equal to or higher than a reference value and additionally that an integrated amount of emissions flowing out of the oxidation catalyst is equal to or smaller than a comparison value. The "emissions" mentioned here are exhaust gas components whose amount increases with the execution of after-injection and include, for example, PM and/or $CO_2$ flowing out of the oxidation catalyst. The "comparison value" is the integrated amount of the emissions flowing out of the oxidation catalyst in the case where conventional temperature raising processing is executed.

Figure 6:
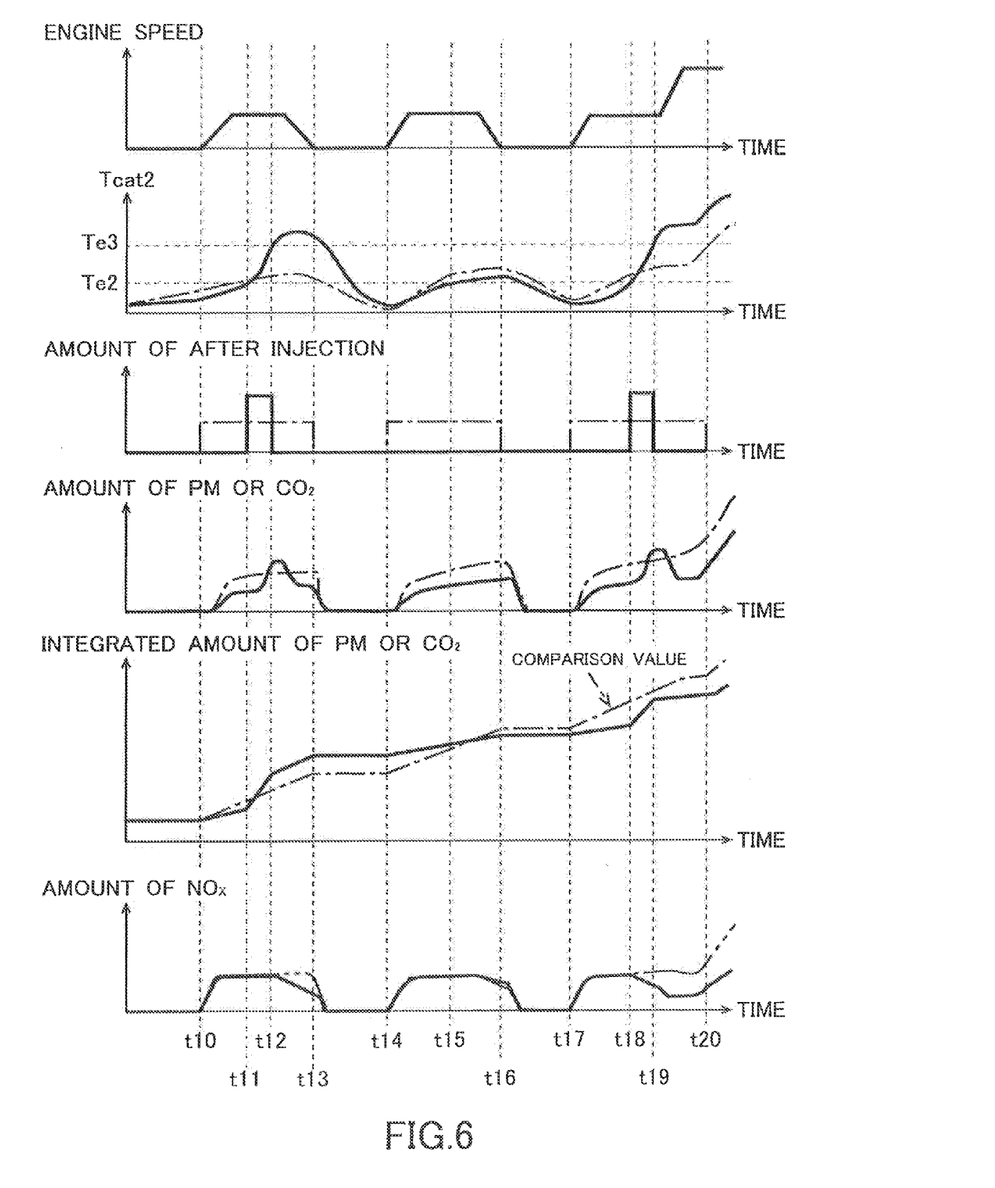
FIG. 6 is a timing chart of a method of executing temperature raising processing in a second embodiment.

FIG. 6 is a timing chart showing a method of performing the temperature raising processing in this embodiment. The timing chart in FIG. 6 shows a method of executing the temperature raising process in a case where start and stop of operation of the internal combustion engine 1 is repeated three times. In FIG. 6, the solid curves represent data in a case where the temperature raising processing according to the present invention is performed, and the dot-and-dash curves represent data in a case where the conventional temperature raising processing is executed.

In FIG. 6, when the temperature Tcat2 of the selective reduction catalyst reaches the aforementioned second temperature Te2 (at t11 in FIG. 6) during the period from the first start of the internal combustion engine 1 (at t16 in FIG. 6) to the stop of operation (at t13 in FIG. 6), the integrated amount of PM or $CO_2$ (integrated PM/$CO_2$ amount) flowing out of the oxidation catalyst is smaller than the comparison value, and the temperature raising processing is executed consequently. The temperature raising processing is terminated at the time when the temperature Tcat2 of the selective reduction catalyst reaches the aforementioned third temperature Te3 (at t12 in FIG. 6).

During the period from the first stop of operation of the internal combustion engine 1 (at t13 in FIG. 6) to the second start (at t14 in FIG. 6), the temperature Tcat2 of the selective reduction catalyst falls to a temperature range lower than the aforementioned second temperature Te2. However, during the period from the second start of the internal combustion engine 1 (at t14 in FIG. 6) to the stop of operation (at t16 in FIG. 6), the integrated PM/$CO_2$ amount is larger than the comparison value at the time (t15 in FIG. 6) when the temperature Tcat2 of the selective reduction catalyst reaches the aforementioned second temperature Te2, and therefore the temperature raising processing is not executed.

At the time (t18 in FIG. 6) when the temperature Tcat2 of the selective reduction catalyst reaches the aforementioned second temperature Te2 after the third start of the internal combustion engine 1 (at t17 in FIG. 6), the integrated PM/$CO_2$ amount is smaller than the comparison value, and therefore the temperature raising processing is executed.

The comparison value in FIG. 6 is the integrated PM/$CO_2$ amount in the case where the conventional temperature raising processing is executed. The integrated PM/$CO_2$ amount in the case where the temperature raising processing according to the present invention is executed and the integrated PM/$CO_2$ amount in the case where the conventional temperature raising processing is executed can be calculated using known parameters such as the amount of after-injection and the temperature of the oxidation catalyst.

If the temperature raising processing is executed according to the method shown in FIG. 6, the amount of PM and/or $CO_2$ flowing out of the oxidation catalyst per one execution of the temperature raising processing may possibly be larger than that in the case where the conventional temperature raising processing is executed. However, since the temperature raising processing is not executed when the integrated PM/$CO_2$ amount is larger than the comparison amount, the integrated PM/$CO_2$ amount over a long period of time during which the start and stop of operation is repeated plural times can be made smaller than that in the case where the conventional temperature raising processing is executed. Consequently, the integrated PM/$CO_2$ amount over the long term can be made smaller than that in the case where the conventional temperature raising processing is executed, no matter how the internal combustion engine 1 operates.

There is a concern that the $NO_x$ removal rate of the selective reduction catalyst in the case where the temperature raising processing according to the present invention is not executed may be lower than that in the case where the conventional temperature raising processing is executed. However, the conventional temperature raising processing is executed when the temperature change ratio is low. Consequently, as is the case during the period from t14 to t16 in FIG. 6, the amount of $NO_x$ emitted to the atmosphere in the case where the temperature raising processing according to the present invention is not executed is substantially equal to the amount of $NO_x$ emitted to the atmosphere in the case where the conventional temperature raising processing is executed. In contrast, the amount of $NO_x$ emitted to the atmosphere in the case where the temperature raising processing according to the present invention is executed is significantly smaller than the amount of $NO_x$ emitted to the atmosphere in the case where the conventional temperature raising processing is executed. Therefore, the amount of $NO_x$ emitted to the atmosphere over the long term is smaller in the case where the temperature raising processing according to the present invention is executed than in the case where the conventional temperature raising processing is executed.

In the following, a procedure of executing the temperature raising processing in this embodiment will be described with reference to the flow chart in FIG. 7. FIG. 7 is a flow chart of a processing routine executed by the ECU 10 when the temperature raising processing is executed. This processing routine is stored in the ROM or the like of the ECU 10 in advance and executed by the ECU 10 periodically. In FIG. 7, the processing steps that are the same as those in the processing routine of the above-described first embodiment (FIG. 5) are denoted by the same symbols.

Figure 7:
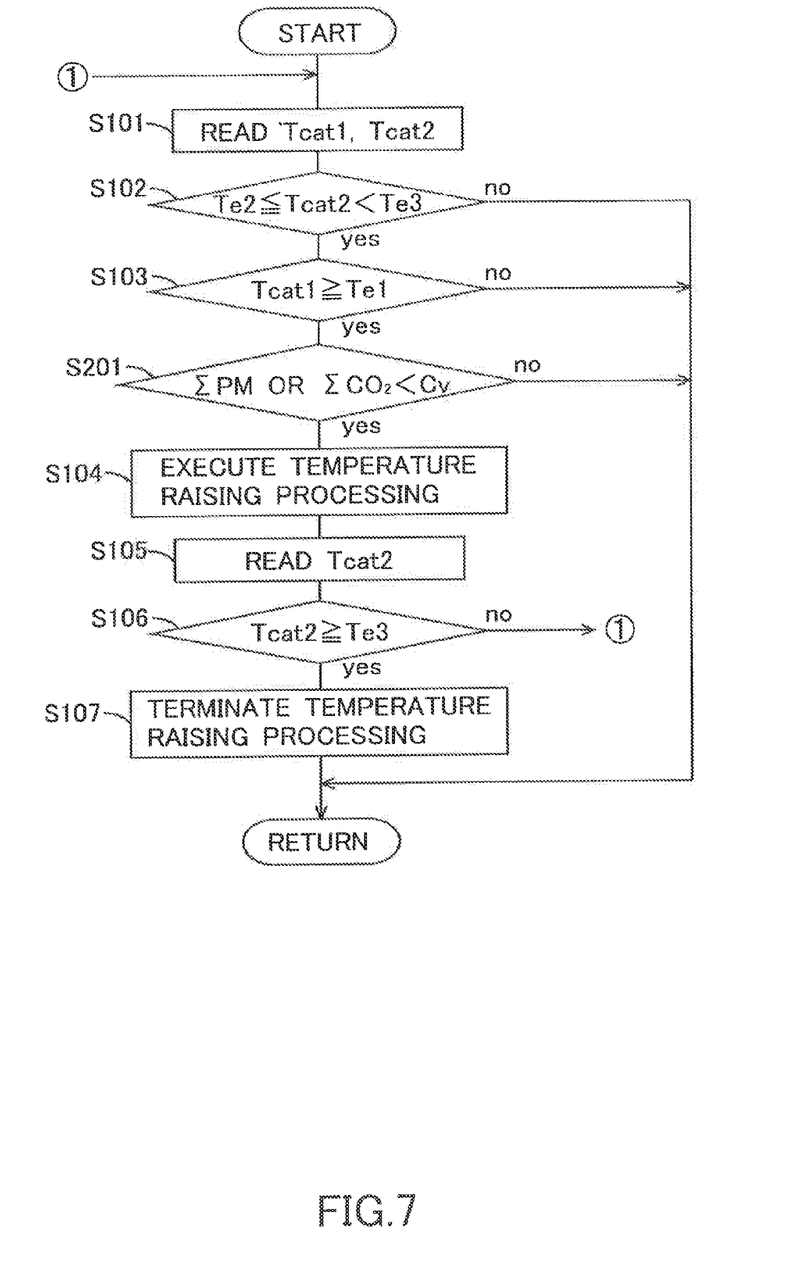
FIG. 7 is a flow chart of a processing routine executed by an ECU when the temperature raising processing i executed in the second embodiment.

In the processing routine in FIG. 7, if the determination made in step S103 is affirmative (Tcat1≥Te1), the ECU 10 executes the processing of step S201. In step S201, the ECU 10 determines whether or not the integrated $PM/CO_2$ amount $\Sigma PM/CO_2$ is smaller than a comparison value Cv. The integrated $PM/CO_2$ amount $\Sigma PM/CO_2$ is calculated successively using as parameters the air-fuel ratio of the exhaust gas, the temperature of the oxidation catalyst, and the amount of after-injection etc. The comparison value Cv is calculated successively using as parameters the amount of after-injection assumed to be set in the case where the conventional temperature raising processing is executed, the air-fuel ratio of the exhaust gas, the temperature of the oxidation catalyst, and the amount of after-injection etc. The calculation of the integrated $PM/CO_2$ amount $\Sigma PM/CO_2$ and the comparison value Cv by the ECU 10 in the above-described way embodies the calculating means according to the present invention.

If the determination made in the above step S201 is negative, the ECU 10 terminates the execution of this routine without executing the temperature raising processing. On the other hand, if the determination made in the above step S201 is affirmative, the ECU 10 proceeds to step S104, where it executes the temperature raising processing.

By executing the temperature raising processing according to the above-described procedure, advantageous effects same as the above-described first embodiment can be enjoyed, and the integrated $PM/CO_2$ amount and the amount of $NO_x$ emitted to the atmosphere over the long term can be made smaller than those in the case where the conventional temperature raising processing is executed. Consequently, it is possible to reduce the amount of $NO_x$ emitted to the atmosphere while keeping the increase in emissions with the execution of the temperature raising processing small in various cases, for example, in cases where start and restart of the internal combustion engine 1 is repeated in a short time, and in cases where a low load operation state continues after the start of the internal combustion engine 1.

While cases in which a selective reduction catalyst is used as the $NO_x$ catalyst according to the present invention have been described in the above-described first and second embodiments, the catalyst may be a storage reduction catalyst. Moreover, while cases in which a particulate filter is arranged in the exhaust passage 3 upstream of the selective reduction catalyst have been described in the above-described first and second embodiments, the particulate filter may be arranged in the exhaust passage downstream of the selective reduction catalyst, or the selective reduction catalyst may be supported on the particulate filter. In short, the present invention can be applied to any arrangement in which the oxidation catalyst is arranged in the exhaust passage 3 upstream of the selective reduction catalyst.

DESCRIPTION OF THE REFERENCE SIGNS

1: internal combustion engine
2: intake passage
3: exhaust passage
4: throttle valve
5: first catalyst casing
6: second catalyst casing
7: reducing agent addition valve
8: first exhaust gas temperature sensor
9: second exhaust gas temperature sensor
10: ECU
11: crank position sensor
12: accelerator position sensor 12
13: air flow meter
14: A/F sensor
70: pump
71: reducing agent tank

The invention claimed is:

1. An exhaust gas purification apparatus for an internal combustion engine, comprising:
    an $NO_x$ catalyst provided in an exhaust passage of an internal combustion engine mounted on a vehicle;
    a temperature sensor for measuring the temperature of said $NO_x$ catalyst; and
    an electronic control unit programmed to:
        determine a temperature change ratio, which is defined to be a ratio of an increase in an $NO_x$ removal rate to a raise in the temperature of the $NO_x$ catalyst, and
        execute temperature raising processing, which is processing for raising the temperature is said $NO_x$ catalyst, by raising temperature of exhaust gas flowing into said $NO_x$ catalyst, on condition that the temperature chance ratio is equal to or higher than a reference value.

2. An exhaust gas purification apparatus for an internal combustion engine according to claim 1, further comprising an oxidation catalyst provided in the exhaust passage upstream of said $NO_x$ catalyst, wherein
    said temperature raising processing is a processing of supplying unburned fuel to said oxidation catalyst, and
    said electronic control unit is further programmed to execute said temperature raising processing on a further condition that temperature of said oxidation catalyst is equal to or higher than a predetermined activation temperature and said temperature change ratio is equal to or higher than said reference value.

3. An exhaust gas purification apparatus for an internal combustion engine according to claim 2, wherein said electronic control unit is further programmed to integrate amount of emissions contained in exhaust gas flowing out of said oxidation catalyst, and disable the execution of said temperature raising processing when the integrated amount of emissions is larger than a comparison value.

4. An exhaust gas purification apparatus for an internal combustion engine according to claim 3, wherein said electronic control unit is further programmed to decrease amount of unburned fuel supplied to said oxidation catalyst when the $NO_x$ removal rate of said $NO_x$ catalyst exceeds a specific value while said temperature raising processing is being executed.

5. An exhaust gas purification apparatus for an internal combustion engine according to claim 4, wherein said electronic control unit is further programmed to determine that said temperature change ratio is equal to or higher than said reference value if the temperature measured by said temperature sensor falls within a predetermined temperature range.

6. An exhaust gas purification apparatus for an internal combustion engine according to claim 4, wherein said electronic control unit is further programmed to determine that said temperature change ratio is equal to or higher than said reference value if the $NO_x$ removal rate of said $NO_x$ catalyst falls within a predetermined range of the removal rate.

7. An exhaust gas purification apparatus for an internal combustion engine according to claim 3, wherein said electronic control unit is further programmed to determine that said temperature change ratio is equal to or higher than said reference value if the temperature measured by said temperature sensor falls within a predetermined temperature range.

8. An exhaust gas purification apparatus for an internal combustion engine according to claim 3, wherein said electronic control unit is further programmed to determine that said temperature change ratio is equal to or higher than said reference value if the $NO_x$ removal rate of said $NO_x$ catalyst falls within a predetermined range of the removal rate.

9. An exhaust gas purification apparatus for an internal combustion engine according to claim 2, wherein said electronic control unit is further programmed to decrease amount of unburned fuel supplied to said oxidation catalyst when the $NO_x$ removal rate of said $NO_x$ catalyst exceeds a specific value while said temperature raising processing is being executed.

10. An exhaust gas purification apparatus for an internal combustion engine according to claim 9, wherein said electronic control unit is further programmed to determine that said temperature change ratio is equal to or higher than said reference value if the temperature measured by said temperature sensor falls within a predetermined temperature range.

11. An exhaust gas purification apparatus for an internal combustion engine according to claim 9, wherein said electronic control unit determines is further programmed to determine that said temperature change ratio is equal to or higher than said reference value if the $NO_x$ removal rate of said $NO_x$ catalyst falls within a predetermined range of the removal rate.

12. An exhaust gas purification apparatus for an internal combustion engine according to claim 2, wherein said electronic control unit is further pro rammed to determine that said temperature change ratio is equal to or higher than said reference value if the temperature measured by said temperature sensor falls within a predetermined temperature range.

13. An exhaust gas purification apparatus for an internal combustion engine according to claim 2, wherein said electronic control unit is further programmed to determine that said temperature change ratio is equal to or higher than said reference value if the $NO_x$ removal rate of said $NO_x$ catalyst falls within a predetermined range of the removal rate.

14. An exhaust gas purification apparatus for an internal combustion engine according to claim 1, wherein said electronic control unit is further programmed to determine that said temperature change ratio is equal to or higher than said reference value if the temperature measured by said temperature sensor falls within a predetermined temperature range.

15. An exhaust gas purification apparatus for an internal combustion engine according to claim 1, wherein said electronic control unit is further programmed to determine that said temperature change ratio is equal to or higher than said reference value if the $NO_x$ removal rate of said $NO_x$ catalyst falls within a predetermined range of the removal rate.

* * * * *